(12) United States Patent
Domi

(10) Patent No.: US 6,202,201 B1
(45) Date of Patent: Mar. 13, 2001

(54) TEXT OBJECT COMPILATION METHOD AND SYSTEM

(75) Inventor: Dwayne K. Domi, Santee, CA (US)

(73) Assignee: Netcreate Systems, Inc., San Diego, CA (US)

( * ) Notice: Subject to any disclaimer, the term of this patent is extended or adjusted under 35 U.S.C. 154(b) by 0 days.

(21) Appl. No.: 09/159,304

(22) Filed: Sep. 23, 1998

(51) Int. Cl.[7] ....................................................... G06F 9/45
(52) U.S. Cl. ................................. 717/5; 717/8; 707/513
(58) Field of Search ....................... 717/5, 7, 8; 707/513, 707/516, 522, 523, 524, 525; 704/1–9

(56) References Cited

U.S. PATENT DOCUMENTS

| | | | |
|---|---|---|---|
| 5,181,162 | 1/1993 | Smith et al. | 364/419 |
| 5,339,419 * | 8/1994 | Chan et al. | 395/707 |
| 5,442,792 | 8/1995 | Chun | 395/700 |
| 5,560,015 | 9/1996 | Onodera | 395/700 |
| 5,668,999 | 9/1997 | Gosling | 395/704 |
| 5,692,047 | 11/1997 | McManis | 380/4 |
| 5,706,502 | 1/1998 | Foley et al. | 395/610 |
| 5,708,825 * | 1/1998 | Sotomayor | 707/501 |
| 5,768,592 | 6/1998 | Chang | 395/704 |
| 5,884,014 * | 3/1999 | Huttenlocher et al. | 395/114 |
| 5,944,784 * | 8/1999 | Simonoff et al. | 709/203 |
| 5,991,713 * | 11/1999 | Unger et al. | 704/9 |

OTHER PUBLICATIONS

Lindland et al., "Transformations in CASE tools—A compiler view", IEEE, 1993, pp. 287–296.*

Sandewall, "Towards a world–wide data base", Computer Networks and ISDN Systems, Elsevier Science B.V., 1996, pp. 1513, 1522.*

* cited by examiner

*Primary Examiner*—Kakali Chaki
(74) *Attorney, Agent, or Firm*—Glenn J. Perry; James Y. Sze; Pillsbury Winthrop LLP

(57) ABSTRACT

A Text Object Compiler and Language able to produce binary and text objects that are not machine language code. An object oriented computer language that produces target files of information in any text or binary format; files are defined by the programmer as "pages" and file locations are defined by the programmer as "targets." The compiler compiles the language to produce any variety of output, which include text formats (such as HTML, SGML, and other scripting languages) and binary formats (such as graphical pictures, binary data, or other multimedia information).

50 Claims, 6 Drawing Sheets

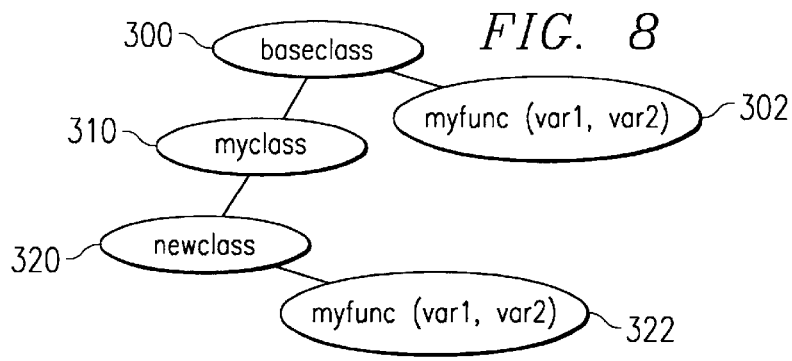
FIG. 8
FIG. 9
300,301,302 —
```
baseclass
    var: title = This is my document title
    func: = myfunc (var1, var2)
            <H1> var1 </H1>
            <H2> var2 </H2>
    endfunc
```
310,311,312 —
```
myclass
    var: title = This is the document title for myclass
    func: myfunc inherited from baseclass
```
320,321,322 —
```
newclass
    var: title inherited from myclass
    func: myfunc (var1, var2)
            <center>
                var1 <br>
                var2
            </center>
    endfunc
```
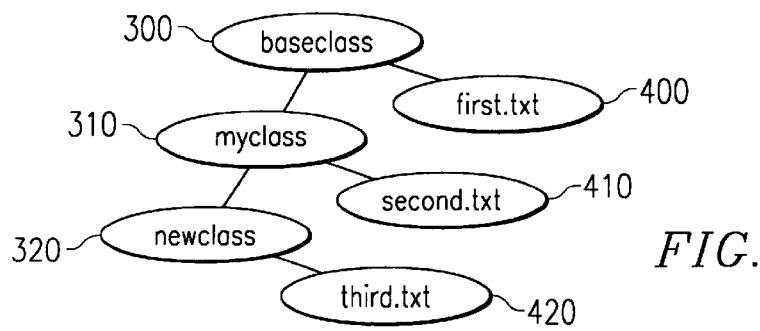
FIG. 10

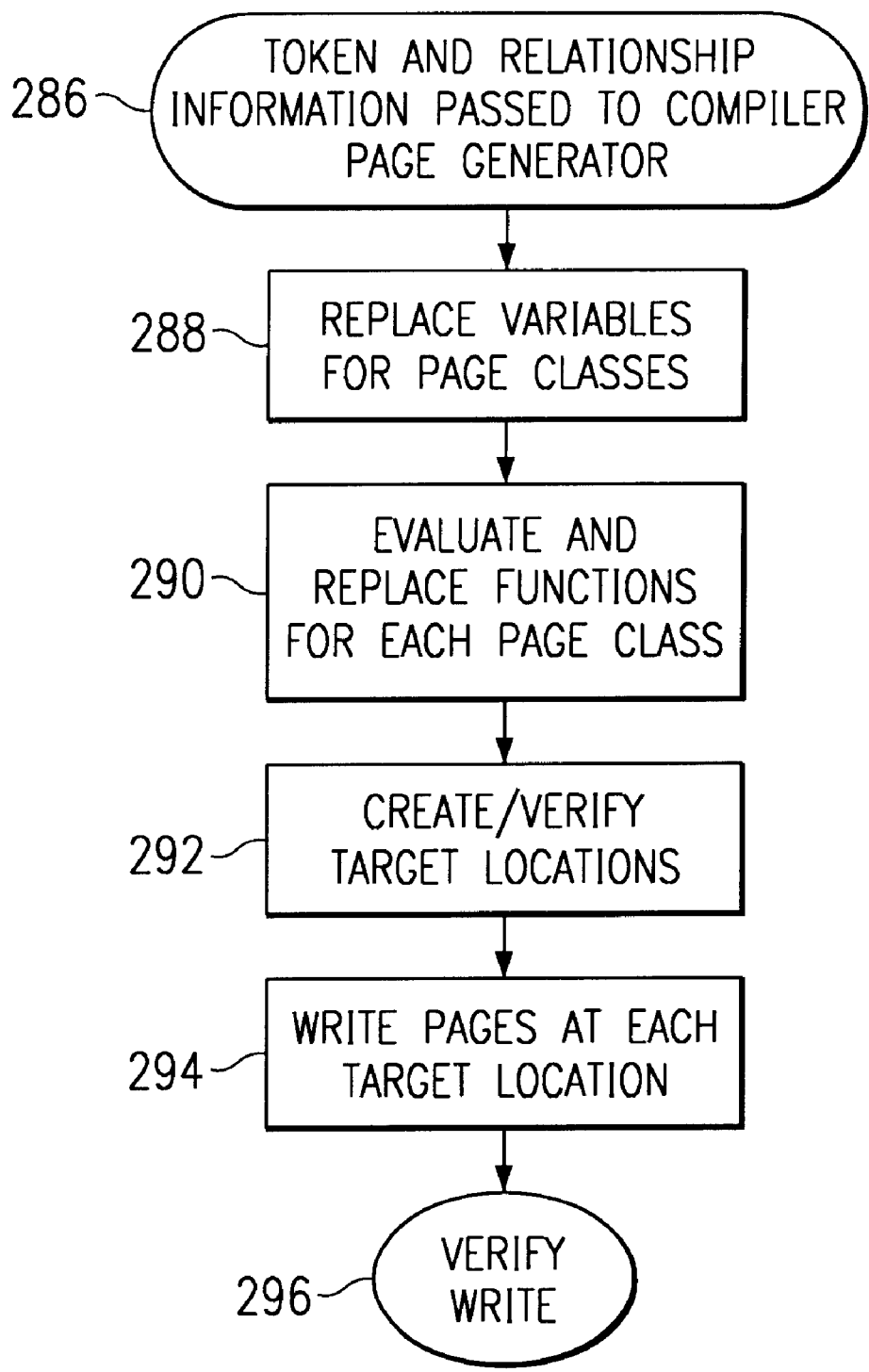

TEXT OBJECT COMPILATION METHOD AND SYSTEM

BACKGROUND OF THE INVENTION

1. Field of the Invention

This invention relates to the field of software compilers, and more particularly relates to a method of generating files of information from one or more source files.

2. Description of the Related Art

In March, 1989, the European Laboratory for Particle Physics or CERN (Conseil Europeen pour la Recherche Nucleaire) developed the World-Wide-Web (WWW, or simply, "the web"), an Internet-based computer network that allows users on one computer to access information stored on other computers through a world-wide network. With an intuitive user-interface, known as a web browser, the web rapidly became a popular way of transmitting and accessing text and binary information. Since then, there has been a massive expansion in the number of World-Wide-Web sites, and the amount of information placed on the web.

Information, in the form of electronic files, documents, images, sounds and other formats, forms the basis of internet and web content, and the key to creating a useful and meaningful web-site.

To place information on the web, the information must be stored in a binary or text format in a "file." Binary documents are saved in known formats that depend upon the information being stored. For example, two-dimensional pictures are often stored in "Joint Photographic Experts Group" (JPEG) or "Graphical Image Format" (GIF) standard formats. Audio files and moving images have other formats as well, such as "WAV," "MOV," and "MPEG." For text documents, documents are stored in a HyperText Markup Language (HTML) format. The HTML format dictates the appearance and structure of a web text document, also referred to as a "web page."

Although these formats are required to create compatibility for web browsers, modifying web sites and updating information in these rigid formats is difficult and time consuming. For example, suppose every web page had a copyright notice on it. To update the copyright notice on every page, a web-site administrator would have to either change every page by hand, or use a method of global-search-and-replace. However, because of the non-uniform manner of some web-sites, a global-search-and-replace may not work. More complicated web page changes, such as modifying small applications, known as "applets," are even more difficult. It would be much better if there was a single location or file that could be updated, and the change would be propagated to the entire web-site, or just the appropriate web pages. Very simply put, the problem of maintaining and generating large amounts of data, in any format, is difficult and highly time consuming.

Several solutions have been proposed, each has its problems.

Some web developers choose to generate web pages through a "what you see is what you get" (WYSIWYG) web-page editor. Such editors assemble web pages through a graphical interface, which makes designing pages simpler, but the results are limited because it does not solve the need to maintain the information. Using the above example, to update the copyright notice on every page, a web-site administrator would still have to edit the web pages individually, or the web-page editor program may use a method of global-search-and-replace.

Alternatively, simple pre-processor programs have been used to assemble HTML files. Such pre-processors allow web-page designers to pre-process documents and insert listed documents into a master document. For example, to include another listed document file called "foo.doc" into the master document, a web-page designer could type:

include "foo.doc"

and the listed document would be included. While this allows fragments of common HTML code to be inserted into documents, as a web-site grows, and more pages are added to the site, the maintenance of such a system quickly becomes a logistical nightmare. Also, the fragments cannot be redefined at the point that they are included in a document. Moreover, such a system is limited strictly to text-based documents, and cannot handle binary forms of information.

U.S. Pat. No. 5,181,162, issued Jan. 19, 1993 to Smith et al. entitled "Document management and production system," discloses a system of decomposing documents into logical components, which are stored as discrete "objects" in an object-oriented computational environment. The system relies on queries to a relational database which occur every time the document is printed, displayed electronically, or electronically transmitted. For a web site, which may transmit pages thousands of times per minute, this solution is a burden on the web server's computing resources. Consequently, the system would be slow, and of limited usefulness to such a high-demand environment. Similarly, the use of a relational database to deliver pages of information on client machines has been attempted; while this provides dynamic construction of documents when they are delivered to the client machines, this solution also burdens the server's computing resources because page information would be constantly regenerated. Although caching generated pages may solve some of the computing resource problems, it creates a new problem because cached pages may be outdated.

Several related patents, U.S. Pat. No. 5,668,999, which issued Sep. 16, 1997 to Gosling ("System and method for preverification of stack usage in bytecode program loops,"), U.S. Pat. No. 5,692,047, issued to McManis ("System and method for executing verifiable programs with facility for using non-verifiable programs from trusted sources,") and U.S. Pat. No. 5,706,502, issued to Foley et al. ("Internet-enabled portfolio manager system and method,"), also fail to solve the problem. Collectively, these patents disclose a method and system of verifying the integrity of computer programs written in a bytecode language to run applications remotely on a client workstation. While this solution may create dynamic client-machine applications, it does not solve the problem of maintaining information in a system.

What is needed is a more flexible way of handling both binary and text information that can produce files of different file formats and still be easy to maintain.

The invention, a Text Object Compiler method, allows users to abstract information, and produce information in virtually any file format.

Almost every contemporary computer is a register-based Von Neuman computer that responds to a machine language. These machine languages include instructions which operate on the contents of registers. Originally, computer software instructions were organized in terms of machine language operations. As computers became more complex, programming in machine language became difficult and increasingly cumbersome. Consequently, computer scientists abstracted machine instructions, creating higher-level languages, known as source languages, structured in terms of expressions and procedures. As software evolved, two strategies for converting source languages into instructions in machine language developed, interpreters and compilers.

An interpreter, written in the native machine language, configures the computer to execute programs written in one of the source languages. The primitive operators or commands of the source language are implemented as a library of subroutines written in the native machine language of the given machine. Interpreters read the source language, one line at a time, and then perform the specified operation. A program to be interpreted, the source program, is represented as a data structure. The interpreter traverses this data structure, analyzing the source program. As it does so, it simulates the intended behavior of the source program by calling appropriate primitive operators from the library.

Instead of analyzing and translating the source program into machine language during execution, it is possible to perform these tasks before execution, enabling more efficient program execution. This alternate method of converting source languages into instructions is called compilation. The program that does the analysis of the source program and reduces the source program to machine language is called a compiler. As shown in FIG. 1, a conventional (i.e., prior art) compiler 2 for a given source language and machine translates computer source code 1 (i.e., a program written in a high level "computer language") into an object code 3, a program written in the computer's native language, referred to in the art as "machine language."

Illustrated by FIG. 2, a conventional compiler 2 is composed of a lexical analyzer 10, a parser 20, and code generator 30. A lexical analyzer 10 takes computer source code 1 and divides the code into lexical tokens. Such lexical tokens can be based on instructions or other keywords in the relevant high level computer language. A parser 20 takes the tokens and groups them together logically based on the relationships established by the source language and the computer source code 1. Lastly, a code generator 30 takes the relationships established by the parser 20 and translates them into an executable computer object code 3 in computer machine language.

Conventional compilers are well known in the prior art, such as U.S. Pat. No. 5,560,015 ("Compiler and method of compilation" issued to Onodera on Sep. 24, 1996), U.S. Pat. No. 5,442,792 ("Expert system compilation method" issued to Chun on Aug. 15, 1995), and U.S. Pat. No. 5,768,592 ("Method and apparatus for managing profile data" issued to Chang on Jun. 16, 1998).

Conventional interpreters and compilers convert high-level computer source code into object code to be executed on a computer. In effect, the interpreter and the compiler allow computer programmers to write computer programs at a higher level of abstraction, and generate object code.

SUMMARY OF THE INVENTION

The invention, a Text Object Compiler (TOC) method and system, applies this same level of abstraction to information as a conventional compiler applies to computer programs. A user designs abstract source code which is compiled into a file or a plurality of files, which is not object machine language code. Instead, the TOC produces information in virtually any information format, as text or binary files. The TOC reads one or more source files written as a Text Object Language (TOL) in ASCII text and processes the source files into one or more output files in any document format. The compilation process reorganizes the information in the source files into output document formats, and may contain compile-time utility commands to facilitate the document generation process.

In the first embodiment, a lexical analyzer tokenizes a source input written in TOL regular expressions to produce a token representing the source input. Such TOL expressions may contain variables, functions, and classes. A parser determines the relationships between the tokens so that a page generator can evaluate the tokens and the relationships between the tokens to generate an output. The resulting output may be written as a file at a target location specified by the source input.

In another aspect of the invention, the source input is lexically analyzed to produce tokens representing regular expressions of the source input. The regular expressions are written in the Text Object Language and may include variables, functions and classes. The regular expressions are parsed to determine the relationship between the tokens. For instance, any class relationship between tokens is determined within this method. Finally the tokens and relationships are evaluated to generate a non-executable output. The non-executable output may then be written to a file. The file location may be specified by the original source input as a specific target location.

An embodiment of the present invention, the source input, written regular expressions of a Text Object Language, is initially read. The regular expressions contain page definitions used to determine the output of the process, and may additionally contain variables, functions, target locations and object-oriented classes. Once read, the source input is lexically analyzed to produce token representations of the regular expressions, which includes tokens generated from the page definitions. The tokens are parsed to determine the relationship between the tokens, and the resulting relationship is constructed in computer memory. Each variable and function is evaluated and their value is determined. The determined value replace their corresponding variable or function token in computer memory. The non-executable file based on the computer memory representation of the page tokens is then written to a file at a target location specified within the source input.

BRIEF DESCRIPTION OF THE DRAWINGS

The foregoing and other objects, features, and advantages of the present invention will be better understood in view of the following detailed description made in conjunction with the accompanying drawing in which:

FIG. 8 is an inheritance diagram showing the relationship of class functions and the classes;

FIG. 9 is an inheritance diagram consolidating the classes with their functions and variables;

FIG. 10 is an inheritance diagram showing the relationship of the defined pages and the classes;

FIG. 14 is a flowchart detailing the page generation subprocess.

DETAILED DESCRIPTION OF THE INVENTION

Figure 3:
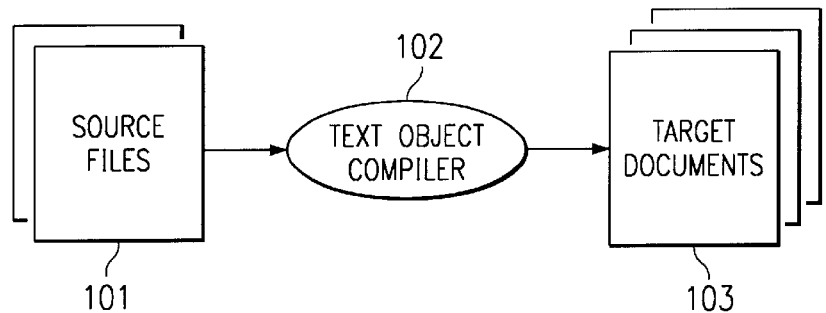
FIG. 3 diagrams an overview of the Text Object Compiler (TOC) process.

The Text Object Compiler uses a variety of existing programming and compiler methods that are commonly used in programming languages to create executable files. The unique aspect of TOC is that it is applied to creating non-executable files, which are referred to as "target documents." Examples of target documents include text formats (such as HTML, SGML, and scripting languages) and binary formats (such as graphical pictures, binary data, and other multimedia information). As shown in FIG. 3, source files 101, written in a Text Object Language (TOL) are compiled by the TOC 102 to produce target documents 103 as output.

The target document locations are definable by the programmer, and the location is referred to as a "target location." Target documents 103 can be any type of format, and can even produce other source files used by other compilers or programs. The TOC 102 actually knows nothing about the format of the target documents 103; the target document format is solely up to the programmer.

Reference will now be made in detail to the preferred embodiments of the invention, examples of which are illustrated in the accompanying drawings. While the invention will be described in conjunction with the embodiments, it will be understood that they are not intended to limit the invention to those embodiments. On the contrary, the invention is intended to cover alternatives, modifications and equivalents, which may be included within the spirit and scope of the invention as defined by the appended claims.

The Text Object Language (TOL)

An embodiment, the source file or files are written in a Text Object Language, which when compiled or interpreted will result in at least one target file. A listing of some of the TOL operators is provided in Table 1.

TABLE 1

TOL Operators

| Operator | Description |
| --- | --- |
| := | The equality operator tells the compiler to define the keyword on the left-hand-side of the operator as the value on the right-hand-side of the operator. For example, the usage "length := 5" would define the variable "length" with the value of 5. |
| // | This operator indicates to the compiler the presence of a comment-line. The compiler ignores the remainder of the line. |
| #include := filename | Imports a source file named "filename" for compilation. |
| class classname := baseclass | Defines a page class. Classname must be specified. Baseclass, if omitted, is assumed to be the base class for TOL.<br>A class inherits all of the variables and functions of its base class. Classes can be public, private, or protected. A class can declare other classes as friends; a friend class is given public access to all of the declaring class' variables and functions. Within a class, variables or functions can be declared friends. |
| cleartargets := directory | Clears all targets previously inline. |
| debug :=[on/off] | Enables/Disables debug while compiling. The default is to stop the debugger from source code. |
| func (classname) := name (var1, ... , varN = value)<br>endfunc | Begins a new function. If classname is omitted, then the class is assumed to be the base class. The function name, name, must be unique for a class. The function can contain zero or more variables, var1, var2, etc.<br>Functions can be overloaded, with several functions of the same name, but with different number of variables; overloaded functions must contain a unique number of variables.<br>Functions can be public, private, or protected.<br>Functions can be made virtual, forcing them to be defined in a derived class. Once a function is declared virtual, all derived class instances of the function are virtual.<br>Functions can contain a default value, for example, var1=default.<br>Endfunc ends a function section. |
| lfcr := [on/off] | Enables/Disables output file wrapping. |
| page (classname) := filename<br>endpage | Begins a new page section. If classname is omitted, then the class is assumed to be the base class. The compiler builds an output page for each page/endpage section. Within this section, all variables and functions are resolved. Filename is the fully qualified location of the output file.<br>Endpage ends a page section. |
| targets (classname) | Targets allow pages output be directed to different or |

TABLE 1-continued

TOL Operators

| Operator | Description |
| --- | --- |
| endtargets | multiple locations. Example targets include any media or memory storage device, such as disk drives, networked drives, FTP locations, memory cards. Endtargets ends a target section. |
| vars (classname) endvars | Begins a new variables section. If classname is omitted, then the class is assumed to be the base class. Variables can be public, private, or protected. Variables can be made virtual, forcing them to be defined in a derived class. Once a variable is declared virtual, all derived class instances of the variable are virtual. |

The TOL is similar to other programming languages, in that it has variables, classes, functions and subroutines, but uses a language syntax recognized only by the TOC 102. In addition, to the TOL operators, a number of compile-time utility commands exist to facilitate the document generation process.

TABLE 2

TOL Compile-Time Utility Commands

| Utility Command | Description |
| --- | --- |
| beep := length | Causes the system to sound beep with duration of length in milliseconds. The default duration is 100 milliseconds. |
| chdir := path | Changes the current directory to path. Any reference to a path or filename that does not include a drive letter will default to the current drive. "chdir" is executed by the compiler inline. |
| chdrive := driveletter | Changes the current drive. Any reference to a path or filename that does not include a drive letter will assume the current drive. "chdrive" is executed by the compiler inline. |
| copy := source, destination | Copies source to destination when the compiler reaches this inline command. |
| exec := program | Runs the specified application in program. |
| kill := filespec | Deletes the files specified in filespec. |
| md := path | Creates, the directory path. |
| rd := path | Removes the directory path. |

An exemplary source file 101 written in the Text Object Language of Table 1 can be seen in Table 3.

TABLE 3

Example Source File written in the Text Object Language ("mysource.txt")

```
//define the class structure and relationships
class myclass := baseclass
class newclass := myclass
//variable definitions
//baseclass variables
vars
    title := This is my document title
endvars
//variables for myclass pages only
vars (myclass)
    title := This is the document title for myclass
endvars
//functions
//baseclass function example
func:=myfunc (var1, var2)
    <H1>var1</H1>
```

TABLE 3-continued

Example Source File written in the Text Object Language ("mysource.txt")

```
    <H2>var2</H2>
endfunc
//function for newclass pages only
func (newclass):=myfunc(var1, var2)
    <center>
        var1<br>
        var2
    </center>
endfunc
//target documents
page:=first.txt
    myfunc(title, This is a base class example)
endpage
page (myclass):=second.txt
    myfunc(title, This is a myclass example)
endfunc
page (newclass):=third.txt
    myfunc(title, This is a newclass example)
endpage
```

TABLE 3-continued

Example Source File written in the Text Object Language ("mysource.txt")

```
//target locations
targets
    Local Drive := c:\eb
    LAN Drive := n:\eb
    Live Site := ftp://www.netcreate.com/web/html
endtargets
```

As illustrated in the example Text Object code source file 101 of Table 3, there are five primary components of TOL: classes, variables, functions, pages, and targets. Although the concepts of classes, variables, and functions exist in prior art computer languages, the additional concepts of pages and targets exist in the Text Object Language.

TOL classes are similar to and share many of the elements of common Object Oriented Programming (OOP) classes. Classes allow a document programmer to organize document sections into objects that can be reused throughout the source files and applies to any of the target files. Specifying classes is optional, since a default class, or "base class," is always assumed. A "derived" or "child" class inherits all of the variables and functions of its base or "parent" class.

Classes can be public, private, or protected. Public classes allow their functions and variables to be redefined by other classes. By default, all classes are public. Private classes allow their functions and variables to be redefined only by other member or friend classes. Protected classes allow its variables and function to be used only by member functions, friends of the class in which it is declared, and by member functions and friends of classes derived from the protected class. In addition, a class can declare other classes as fiends; a friend class is given public access to all of the declaring class' variables and functions.

Variables allow the source file programmer to represent elements of a target document by reference, and use the reference to create sections or target documents rather than using the actual data. Like classes, in the preferred embodiment, variables can be can be public, private, or protected. Variables can also be made virtual, forcing them to be defined in a derived class; however, once a variable is declared virtual, all inherited class instances of the variable are virtual. Note that no virtual variables of the class may exist within the program until the virtual variable is defined by the derived (child) class.

A function is a convenient way to encapsulate some computation, which can then be used without worrying about its implementation. Functions allow programmers a conceptual way to abstract a recurring procedure without worrying about the details. Functions are similar to typical programming subroutines. Like classes and variables, functions can be public, private, or protected.

Function name overloading allows multiple function instances that provide a common operation on different argument types to share a common name. Functions can be overloaded, with several functions sharing the same name, but each having a different number of variables. Each overloaded function must have a unique number of variables, which allows the compiler to distinguish between each instance of the overloaded function. Functions can be made virtual, forcing them to be defined in a derived (child) class. Once a function is declared virtual, all derived class instances of the function are virtual. A virtual baseclass function is also virtual in the derived class if inherited by the derived class; such a function is treated as an abstract class, and no objects of the class may exist within the program until the function is defined by a derived class.

Pages are unique to the Text Object Language; page parameters instruct the Text Object Compiler 102 how to combine or parse source files 101 into the actual individual target documents 103. A page defines the starting and ending point of a resulting target document 103, and the contents of the target document 103.

Targets are also unique to the Text Object Language. Target parameters define the target location; once defined, the target parameters instruct a Text Object Compiler 102 on where to place the target documents. This location is referred to as the "target location." The target location may be local to the computer running the TOC 102, or at a remote location that can be accessed over a computer network by the computer. If the source files 101 define multiple target locations with the target parameter, the TOC 102 will produce identical target documents 103 at each target location. Multiple targets are useful for creating experimental output, creating backup files for redundancy purposes, and updating main/production server files. For example, a programmer may define two targets to create a primary web-site and its "mirror" web-site at an alternate location. If target parameters are omitted from the Text Object code 101, the target documents 103 will be created in a default local location.

The Text Object Compiler (TOC)

The Text Object Compiler 102 performs the compilation of the text object language source files 101, resulting in target documents 103 defined by the pages parameter as output at a target location defined by the targets parameter. As discussed, target documents 103 may be in any format; note that this distinguishes the TOC 102 from prior art software compilers that which only produce object machine language code, i.e. executable files. Note however, that programmers define the output format of the files with their source program code 101.

Attention will now be given to the TOC structure and method.

Figure 1:
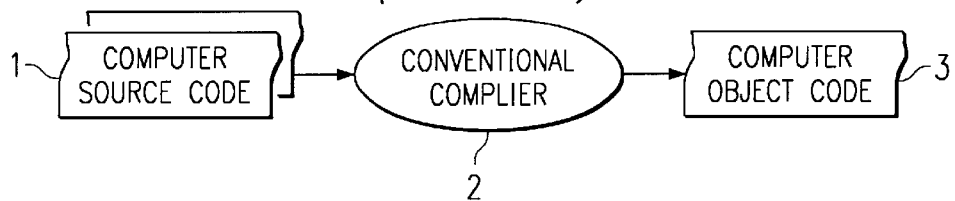
FIG. 1 diagrams an overview of the conventional compiler process (prior art)
Figure 2:
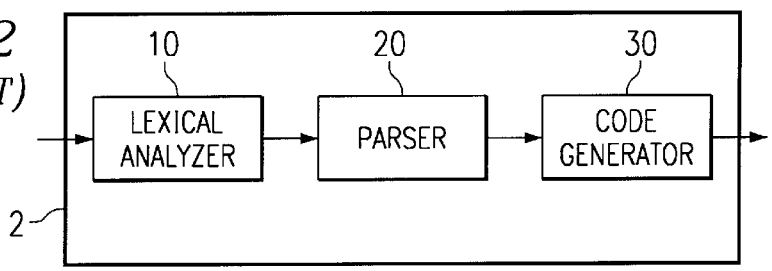
FIG. 2 illustrates the basic components of a conventional compiler (prior art)
Figure 4:
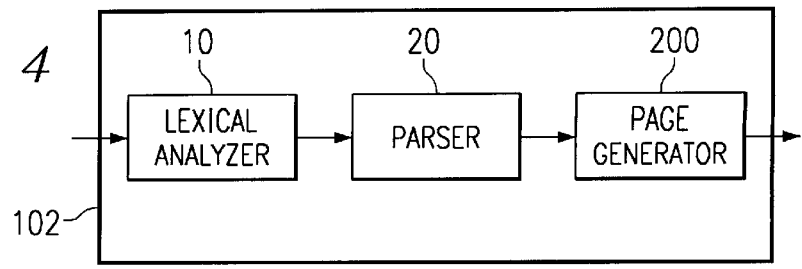
FIG. 4 illustrates the basic components of a Text Object Compiler.

The TOC 102 is similar in structure to a conventional compiler. Like a conventional compiler, the TOC contains a lexical analyzer 10 and a parser 20. However unlike the TOC, a conventional compiler, shown in FIG. 2, feeds parser output into a computer code generator 3, to generate executable computer object code 3. As illustrated in FIG. 4, in a Text Object Compiler 102, the parser 20 output is presented to a page generator 200 to produce the target documents 103 as output.

The TOC lexical analyzer 10 examines expressions in a similar fashion to a conventional compiler lexical analyzer. This division into units, known as "tokens," is a process known in the art as "lexical analysis." Essentially, the lexical analyzer looks for regular expressions. A regular expression is a pattern description using the computer language. The lexical analyzer performs as many regular expression matches as possible, and attempts to classify the text of the entire source file into tokens. In the Text Object Language, the expressions may include variable names, function names, class names, target locations, page definitions, constants, strings, operators, punctuation, and so forth. For example, when compiling the source file in Table 3, the compiler initially classifies each instance of a known operator (as listed in Table 1) as a known token. However, if the word or expression is unknown to the compiler, it too is still tokenized, but its value or relationship must still be determined by the parser.

As the input is divided into tokens, the compiler must establish the relationship between the tokens. The Text Object Compiler needs to find the expressions, statements, declarations, blocks, functions/procedures, class structures, and pages in the program, a process known as "parsing." The list of rules that define the relationships that the compiler understands is called grammar. The grammar of an exemplary Text Object Language is shown above in Table 1.

Figure 5:
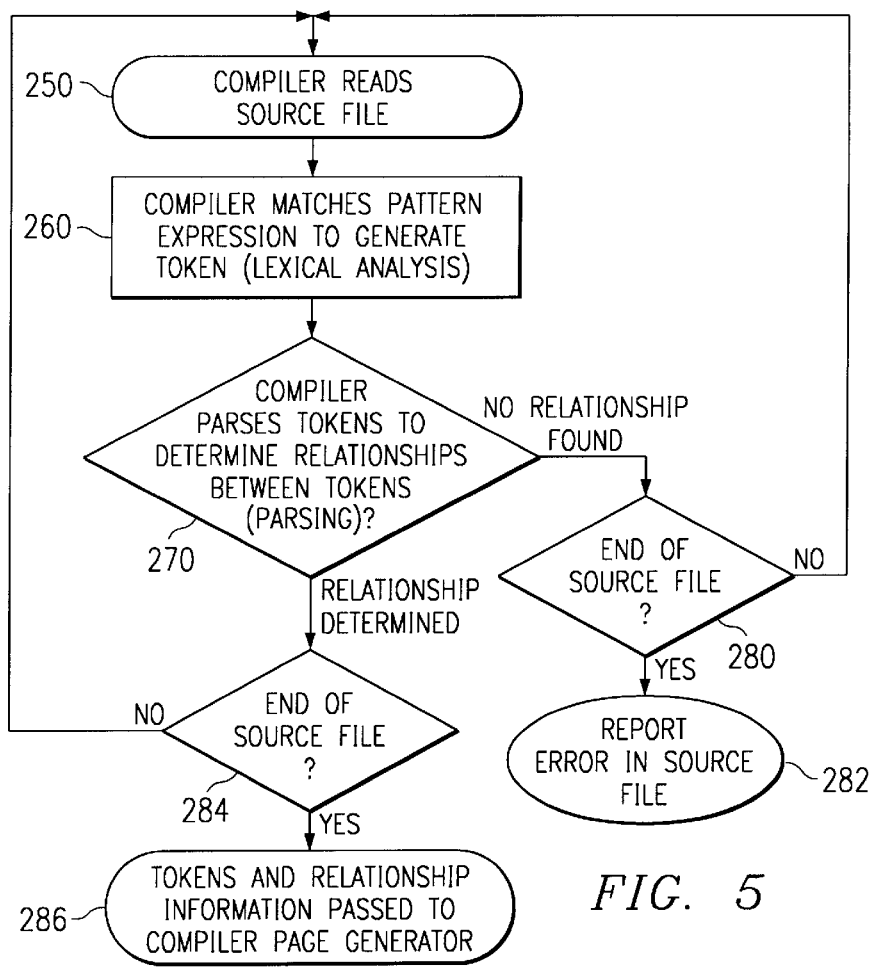
FIG. 5 is a flowchart of the lexical analysis and parsing subprocesses used by the Text Object Compiler.

The Text Object Compilation process is best explained by example. An existing source file 101, such as the example in Table 3 is written in the Text Object Language. The compiler reads the source file, as illustrated in block 250 of FIG. 5. In its process of compiling the source code, a compiler performs two tasks over and over: a.) dividing the input source code into meaningful units (block 260), and b.) discovering the relationship between the units (block 270). These two processes are respectively called "lexical analysis" (block 260) and "parsing" (block 270). If the parser cannot determine the relationship of the token, it next determines whether the end of the source file has been reached, block 280. If the end of the source file has been reached (block 280), the undetermined tokens are an error in either syntax or usage, and an error is reported, block 282. If the end of the source file has not been read, the compiler loops back to block 250, and reads the source file. Similarly, if the parsing of block 270 is successful, and the entire file has not been read, as determined by block 284, the compiler continues to read more lines of the source file, block 250.

An example of the lexical analysis and parsing are as follows. The compiler initially reads the first line of Table 3, block 250. Each word is tokenized, and matched against a known set of regular expressions, such as the TOL Operators. The first known operator, the comment operator ("//") is identified, block 260. As defined by the implementation of this TOL grammar, the remainder of the line is determined to be a comment, and the compiler ignores the remainder of the line, block 270. Since the end of the source file has not been reached, as determined by block 284, the compilation process continues, and the compiler reads the next line of the source file, block 250.

Figure 6:
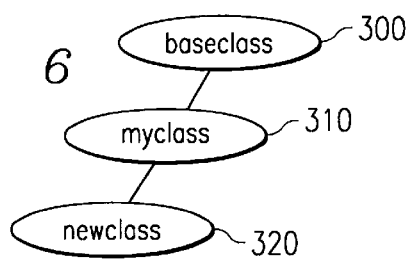
FIG. 6 is an inheritance diagram of the classes of the Text Object Language source file listed in Table 3.

The lexical analyzer notes the presence of four tokens on the second line, the words "class," "myclass" ":=" and "baseclass." block 260. Two of these tokens, "class" and the equality operator (":=") are identified as operators, and a third token, "baseclass" is identified as the "baseclass" keyword, which defines the TOL base class. The token "myclass" is initially unknown by the lexical analyzer. The token information is forwarded to the parser, which realizes that the source file defines a child class "myclass" which descends from the TOL baseclass; block 270. The parser constructs a memory table, memory tree, or equivalent memory structure to categorize the class structure. The process is repeated with the next line, resulting in a class inheritance relationship depicted by FIG. 6. Class myclass 310 is derived from the base class 300, and class newclass 320 is a "child" class derived from the "parent" class myclass 310. The memory tree is expanded to reflect the newclass class.

Figure 7:
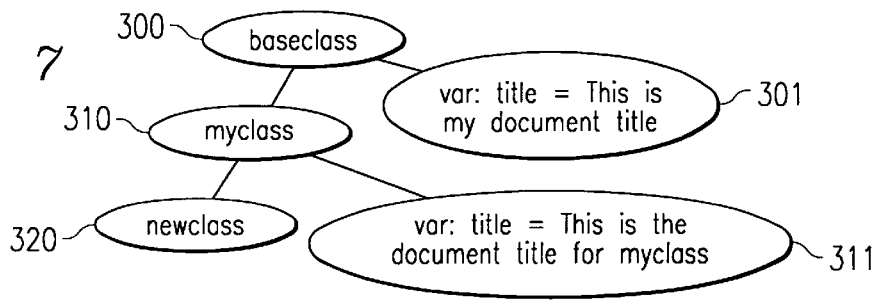
FIG. 7 is an inheritance diagram showing the relationship of class variables and the classes.

The compiler processes the next several lines of Table 3, which consist of variable definitions for the variable "title." The variables are parsed and stored in the memory tree, linked to their appropriate class definition, as shown by FIG. 7. The baseclass 300 is associated with a variable "title" 301. Similarly, myclass 310 is associated with a different definition for another variable called "title" 311.

FIG. 8. illustrates the relationships of the functions declared with their defined classes. The code in Table 3 defines a "myfunc" function that is different for the baseclass 300 and newclass 320; consequently, a myfunc 302 is associated with the baseclass 300, and a different myfunc 322 function is associated with newclass 320.

FIG. 9. consolidates the inheritance diagrams with their related variables and functions. Baseclass 300 has both a variable, title 301, and a function, myfunc 302. The class myclass 310 also has a variable, title 311, and since it does not have a definition for myfunc, it inherits the function definition for myfunc 312 from the baseclass 300 definition of myfunc 302. Similarly, the class newclass 320 does not have a value for the "title" variable, and thus inherits its definition for title 321 from the myclass title definition 311. Newclass 320 does have its own definition for the function myfunc 322, and this is also reflected in the inheritance diagram.

The lexical analysis and parsing process is repeated for both the target document and target location sections of the code. As shown in FIG. 10, the target document "first.txt" 400 is of the baseclass 300, "second.txt" 410 is of class myclass 310, and "third.txt" 420 is of class newclass 320. Each of the three target documents consist of a single function call to the appropriate class function "myfunc."

Once all the source files have been tokenized and parsed to known values, the established token and relationship information is passed to the compiler page generator, block 286.

As shown previously in FIG. 4, the compiler page generator 200 creates each target document based on the relationships and tokens forwarded from the parser 20, replacing variables with their appropriate values, evaluating function calls, and substituting the resulting information into the page table shown in FIG. 10.

The page generator sub-process is elaborated in FIG. 14. The token relationship information is passed to the compiler page generator, block 286. For each page class, the variables are replaced with their respective definitions, block 288. In a simple embodiment, this can merely be the substitution of the value into each memory table location where the variable appears. Each function call for every page class is then evaluated, block 290. The existence of each named target location is verified; if the location, such as a directory, does not exist, it may be created at this time by the compiler, block 292. Each page, corresponding to a target document, is then written at each target location, block 294. Lastly, the write is verified by the compiler, block 296.

Figure 11:
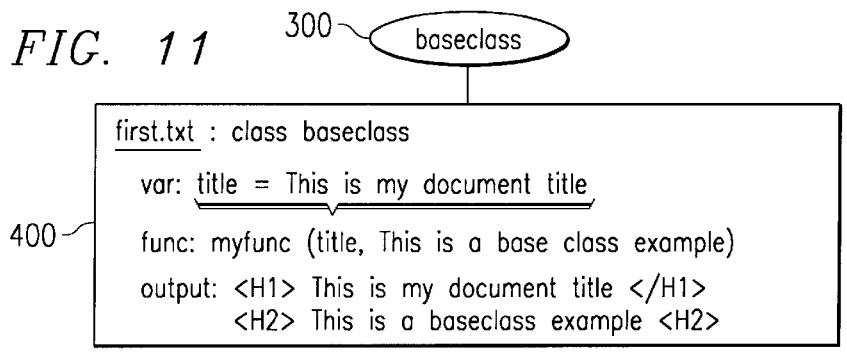
FIG. 11 diagrams the baseclass information used to generate the target document "first.txt"

For example, as illustrated in FIG. 11, the output for "first.txt" 400 is generated by noting the appropriate class, baseclass 300, which defines the functions and variables used in generating the page. Table 3 defines "first.txt" as a page generated by a function call to "myfunc" using the "title" variable and "This is a base class example" as the input. Since "first.txt" is of class baseclass, the definitions for "title" and "myfunc" are taken directly from the baseclass. The results are shown in Table 4.

TABLE 4

Compiled output for "first.txt"

<H1>This is my document title</H1>
<H2>This is a base class example</H2>

Figure 12:
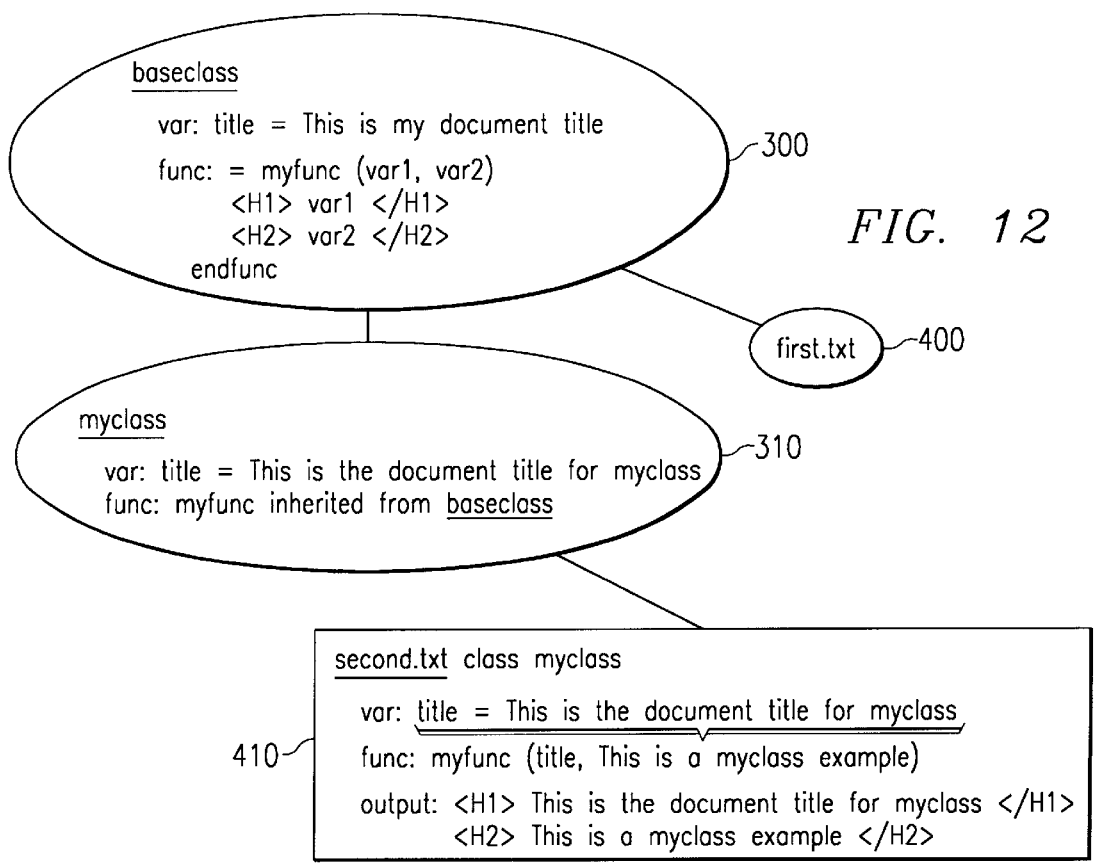
FIG. 12 diagrams the baseclass, and myclass information used to generate the target document "second.txt"

FIG. 12 continues the compilation for "second.txt" 410, which is of class "myclass" 310. The definitions for "title" is taken directly from class myclass 310. The definitions for "myfunc" would normally also be taken from class myclass 310. However, since "myfunc" is not defined for myclass 310, the myfunc function definition for myclass' parent class, baseclass 300, is used. The compiled results for "second.txt" 410 are shown in Table 5.

TABLE 5

Compiled output for "second.txt"

<H1>This is the document title for myclass</H1>
<H2>This is a myclass example</H2>

Figure 13:
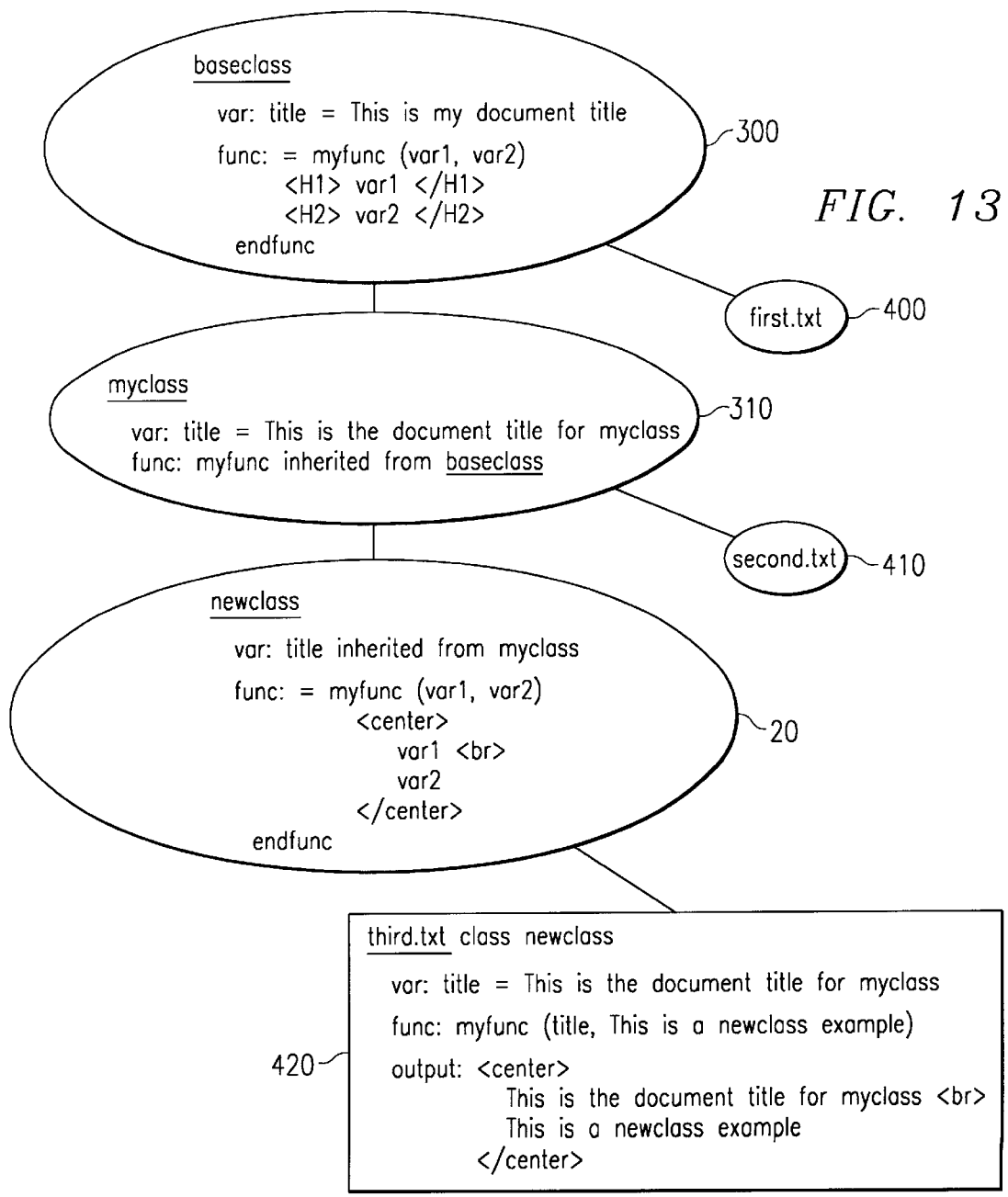
FIG. 13 diagrams the baseclass, myclass, and newclass information used to generate the target document "third.txt"

FIG. 13 continues the compilation for "third.txt" 420, which is of class "newclass" 320. The definitions for "title" and "myfunc" are normally taken directly from class newclass 310. However, since the "title" variable is not defined for newclass 320, the "title" variable definition for newclass' parent class, myclass 310, is used. Since "myfunc" is defined for the class newclass 310, the newclass "myfunc" definition is used. The compiled results for "third.txt" 420 are shown in Table 6.

TABLE 6

Compiled output for "third.txt"

<center>
    This is the document title for myclass<br>
    This is a newclass example
</center>

Once the compiler generates each page in memory, each page is written as a target document at each target location. The compiler may optionally create previously non-existing target locations, and verify the writing at the target locations; in one embodiment, the TOC performs both actions, reporting a warning message if a target location is not created, or an error message if a problem in writing the target document occurs.

We claim:

1. A computer comprising:
    a lexical analyzer that tokenizes a source input to produce tokens representing regular expressions of the source input;
    a parser that determines relationships between the tokens;
    a page generator that evaluates the tokens and the relationships between the tokens to generate an output, the output being a target document.

2. The computer of claim 1 wherein the page generator writes the output as a file.

3. The computer of claim 2 wherein the page generator writes the file at a target location specified within the source input.

4. The computer of claim 2 wherein the target document is a web page.

5. The computer of claim 2 wherein the target document is a graphics file.

6. The computer of claim 2 wherein the target document is an HTML document.

7. The computer of claim 1 wherein the regular expressions include variables.

8. The computer of claim 1 wherein the regular expressions include functions.

9. The computer of claim 1 wherein the regular expressions include classes.

10. The computer of claim 1 wherein the regular expressions include variables, functions, and classes.

11. A method of operating a computer system to compile a Text Object Language comprising:
    lexically analyzing a source input to produce tokens representing regular expressions of the source input;
    parsing the tokens to determine relationships between the tokens;
    evaluating the tokens and the relationships between the tokens to generate a target document.

12. A method of claim 11 further comprising:
    writing the target document to a file.

13. The method of claim 12 wherein the file is written at a target location specified within the source file.

14. The method of claim 9 wherein the target document is a web page.

15. The method of claim 9 wherein the target document is a graphics file.

16. The method of claim 9 wherein the target document is an HTML document.

17. The method of claim 11 wherein the regular expressions include variables.

18. The method of claim 11 wherein the regular expressions include functions.

19. The method of claim 11 wherein the regular expressions include classes.

20. The method of claim 11 wherein the regular expressions include variables, functions, and classes.

21. The method of operating a computer system to compile a Text Object Language comprising:
    reading a source input containing regular expressions of the Text Object Language, wherein the regular expressions of the text object language include variables, functions, and page definitions;
    lexically analyzing the source input to produce tokens of the regular expressions, wherein the tokens include page tokens;
    parsing the tokens to determine relationships between the tokens;
    constructing a representation of the tokens and their relationships in computer memory;
    evaluating the tokens that represent variables and functions to determine their evaluated values;
    replacing the computer memory representation of the variable tokens and the function tokens with their evaluated values;
    writing non-executable files based on the computer memory representation of the page tokens.

22. The method of claim 21 wherein the non-executable files are written in a target location specified by the source input.

23. The method of claim 16 wherein the non-executable files include a web page.

24. The method of claim 16 wherein the non-executable files include a graphics file.

25. The method of claim 16 wherein the non-executable files include an HTML document.

26. A method of claim 21 wherein the regular expressions include classes.

27. A computer-readable medium encoded with data and instructions that when read by a computer, the computer executes processes comprising:
    lexically analyzing a source input to produce tokens representing regular expressions of the source input;
    parsing the tokens to determine relationships between the tokens;
    evaluating the tokens and the relationships between the tokens to generate a target document output.

28. The computer-readable medium of claim 27, wherein the instructions when read by a computer, the computer executes processes further comprising:

writing the target document to a file.

29. The computer-readable medium of claim 28, wherein the file is written at a target location specified within the source input.

30. The computer-readable medium of claim 29, wherein the regular expressions include variables.

31. The computer-readable medium of claim 30, wherein the regular expressions include functions.

32. The computer-readable medium of claim 31, wherein the regular expressions include classes.

33. The computer-readable medium of claim 28, wherein the target document is a web-page.

34. The computer-readable medium of claim 28, wherein the target document is a graphics file.

35. The computer-readable medium of claim 28, wherein the target document is an HTML document.

36. A computer-readable medium encoded with data and instructions that when read by a computer, the computer executes processes comprising:

reading a source input containing regular expressions of a Text Object Language, wherein the regular expressions of the text object language include variables, functions, and page definitions;

lexically analyzing the source input to produce tokens of the regular expressions, the tokens including page tokens;

parsing the tokens to determine relationships between the tokens;

constructing a representation of the tokens and their relationships in computer memory;

evaluating the tokens that represent variables and functions to determine their evaluated values;

replacing the computer memory representation of the variable tokens and the function tokens with their evaluated values;

writing non-executable files based on the computer memory representation of the page tokens.

37. The computer-readable medium of claim 36, wherein the file is written at a target location specified within the source input.

38. The computer-readable medium of claim 37, wherein the target document is a web-page.

39. The computer-readable medium of claim 37, wherein the target document is a graphics file.

40. The computer-readable medium of claim 37, wherein the target document is an HTML document.

41. The computer-readable medium of claim 37, wherein the target document is an SGML document.

42. The computer of claim 2 wherein the target document is an SGML document.

43. The method of claim 9 wherein the target document is an SGML document.

44. The method of claim 16 wherein the non-executable files include an SGML document.

45. The computer-readable medium of claim 28, wherein the target document is an SGML document.

46. The computer-readable medium of claim 37, wherein the target document is a multimedia file.

47. The computer of claim 2 wherein the target document is a multimedia file.

48. The method of claim 9 wherein the target document is a multimedia file.

49. The method of claim 16 wherein the non-executable files include a multimedia file.

50. The computer-readable medium of claim 28, wherein the target document is a multimedia file.

* * * * *